United States Patent [19]

Friedman

[11] Patent Number: 4,888,595

[45] Date of Patent: Dec. 19, 1989

[54] ACQUISITION SIGNAL TRANSMITTER

[75] Inventor: Morton L. Friedman, Lanham, Md.

[73] Assignee: The United States of America as represented by the Administrator of the National Aeronautics and Space Administration, Washington, D.C.

[21] Appl. No.: 165,355

[22] Filed: Feb. 29, 1988

Related U.S. Application Data

[63] Continuation of Ser. No. 929,870, Nov. 13, 1986, abandoned.

[51] Int. Cl.$^4$ ............................................. G01S 3/02
[52] U.S. Cl. .................................... 342/457; 342/385; 342/454; 342/98
[58] Field of Search ................. 342/457, 385, 454, 98, 342/99

[56] References Cited

U.S. PATENT DOCUMENTS

| | | | |
|---|---|---|---|
| 3,461,423 | 8/1969 | Trumble | 455/99 |
| 3,986,119 | 10/1976 | Hemmer, Jr. et al. | 455/15 |
| 4,155,042 | 5/1979 | Permut et al. | 325/64 |
| 4,394,777 | 7/1983 | Wren | 455/95 |
| 4,612,667 | 9/1986 | Hansen | 455/98 |
| 4,651,156 | 3/1987 | Martinez | 342/457 |
| 4,740,792 | 4/1988 | Sagey et al. | 342/457 |

FOREIGN PATENT DOCUMENTS

| | | | |
|---|---|---|---|
| 0006481 | 1/1983 | Japan | 342/385 |
| 0690644 | 10/1979 | U.S.S.R. | 342/385 |
| 1072761 | 2/1985 | U.S.S.R. | 342/385 |
| 0626938 | 7/1949 | United Kingdom | 342/385 |

OTHER PUBLICATIONS

"The Nimbus F Random Access Measurement System (RAMS)", by James L. Coates, IEEE Transactions on Geoscience Electronics, vol. GE-13, No. 1, Jan., 1975, pp. 18-27.

Primary Examiner—Thomas H. Tarcza
Assistant Examiner—David Cain
Attorney, Agent, or Firm—R. Dennis Marchant; John R. Manning; Ronald F. Sandler

[57] ABSTRACT

An encoded information transmitter which transmits a radio frequency carrier that is amplitude modulated by a constant frequency waveform and thereafter amplitude modulated by a predetermined encoded waveform, the constant frequency waveform modulated carrier constituting an acquisition signal and the encoded waveform modulated carrier constituting an information bearing signal, the acquisition signal providing enhanced signal acquisition and interference rejection favoring the information bearing signal. One specific application for this transmitter is as a distress transmitter where a conventional, legislated audio tone modulated signal is transmitted followed first by the acquisition signal and then the information bearing signal, the information bearing signal being encoded with, among other things, vehicle identification data. The acquistion signal enables a receiver to acquire the information bearing signal where the received signal is low and/or where the received signal has a low signal-to-noise ratio in an environment where there are multiple signals in the same frequency band as the information bearing signal.

14 Claims, 4 Drawing Sheets

ACQUISITION SIGNAL TRANSMITTER

ORIGIN OF THE INVENTION

The invention described herein was made by an employee of the United States Government, and may be manufactured and used by or for the Government for governmental purposes without the payment of any royalties thereon or therefor.

This application is a continuation of application Ser. No. 929,870, filed Nov. 13, 1986, now abandoned.

TECHNICAL FIELD

This invention relates to radio transmitters, and more particularly to emergency locating transmitters and to emergency position indicating radio beacons.

BACKGROUND OF THE INVENTION

Emergency locating transmitters (ELTs) are required by federal law on all aircraft travelling more than twenty-five miles from an airport, and emergency position indicating radio beacons (EPIRBs) are required on certain classes of marine vessels. ELTs and EPIRBs are essentially the same device. They differ only in the manner in which they are activated. ELTs are activated by gravitational forces (impact) while EPIRBs are activated by water contact. Both, however, may be manually activated.

Prior art ELTs and EPIRBs transmit a distress waveform on 121.5 MHz and 243 MHz to alert emergency frequency monitors that a distress incident has occurred. The distress waveform transmitted by these devices consists of an amplitude modulated carrier signal in which the modulating signal is an audio frequency sweeping downward over a range of not less than 700 Hz, within the range of 1,600 Hz to 300 Hz, and at a sweep rate varying between 2 Hz and 4 Hz. These characteristics are required by federal law, so that the transmitted distress waveform, which can be demodulated by a receiver to a siren-like sound, may easily be recognized by individuals monitoring on 121.5 MHz and 243 MHz, who can then alert search and rescue (SAR) personnel to search for the location of the source of the distress transmission and initiate rescue operations. The distress waveform, however, does not contain information other than that an ELT or EPIRB is transmitting it. Accordingly, SAR personnel receive no advance information on whether they are searching for an aircraft or a marine vessel. Additional information, such as information which identifies a specific class of transmitter and the identity of the specific vehicle in distress, would greatly aid SAR personnel and allow for more efficient use of SAR resources. Transmitter class information is important because once a receiver identifies a signal as one containing vehicle identity information, it can then extract that information. Vehicle identity information is important because it is an indication of the maximum number of people which need to be rescued. It may also give an indication of what type of rescue operations may be required.

SUMMARY OF THE INVENTION

Accordingly, it is an object of the invention to provide an emergency transmitter in which the signal transmitted identifies the transmitter as belonging to a specific class of transmitters.

Another object of this invention is to provide an emergency transmitter in which the signal transmitted identifies the specific vehicle in distress.

A further object of this invention is to provide an emergency transmitter in which the transmitted signal, when demodulated, always has a distinct, easily recognized sound.

Still another object of this invention is to provide an emergency transmitter in which the characteristics of the signal transmitter are such that it can be detected and its source identified even if the signal is of low power, has a low signal-to-noise ratio, and is present in a channel crowded with other signals.

Another further object of this invention is to provide an emergency transmitter which generates a signal that can be processed simultaneously with other, similar signals in a receiver.

Yet another object of this invention is to provide a modulation scheme which can be implemented by inexpensively modifying conventional emergency transmitters to broadcast more complete information relating to a distress incident.

According to the invention, the foregoing and other objects are attained by providing a transmitter generating three signals which can be broadcast in a predetermined sequence. These signals are, first in time, a radio frequency carrier signal amplitude modulated by a swept frequency, radio waveform, which may be a conventional, legislated distress signal, next the radio frequency carrier signal amplitude modulated by a constant frequency, audio waveform, and thereafter, the radio frequency carrier signal amplitude modulated by a series of pulses having two distinct frequencies occurring in a predetermined pattern.

DETAILED DESCRIPTION

Figure 1:
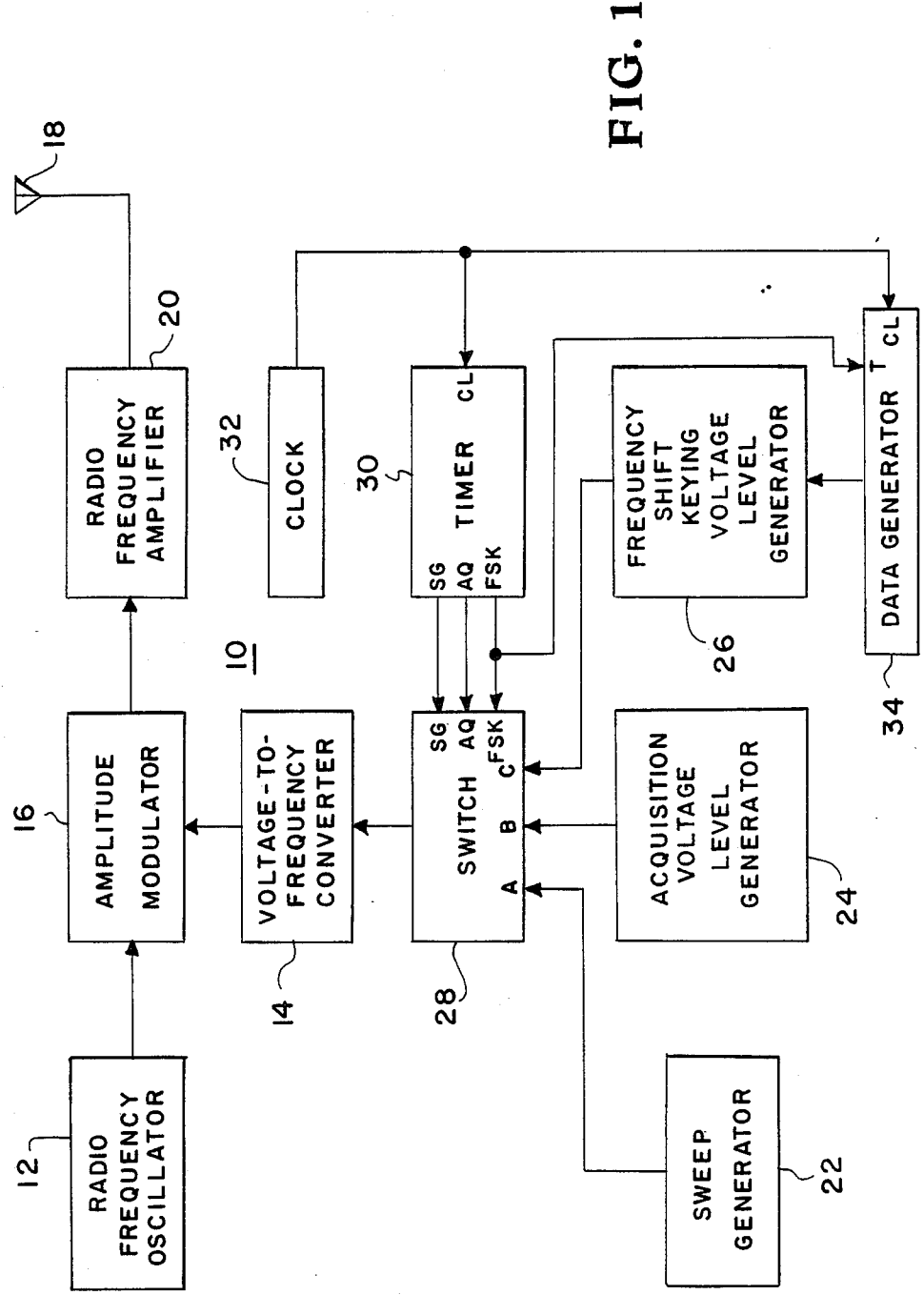
FIG. 1 is a block diagram of an ELT or EPIRB according to the invention.

Referring now to the drawings and more particularly to FIG. 1 wherein the emergency locating transmitter (ELT) or the emergency position indicating radio beacon (EPIRB) is generally identified by reference 10. Transmitter 10 includes a conventional radio frequency oscillator 12 which generates the 121.5 MHz sinusoidal carrier signal assigned by federal regulation. The transmitter also includes a conventional voltage to frequency converter 14 which preferably has a sinusoidal frequency range of 0 Hz to 1600 Hz. The outputs of the oscillator and converter are fed to a conventional amplitude modulator 16 which impresses the sinusoidal output signal from voltage-to-frequency converter 14, upon the carrier signal to produce an amplitude modulated radio frequency signal. The amplitude modulated radio frequency signal is applied to a transmitting antenna 18 through a conventional radio frequency amplifier 20. Amplifier 20 is nonlinear and provides a frequency doubled output signal of 243 MHz as well as an amplified 121.5 MHz output signal.

The instantaneous input signal to voltage-to-frequency converter 14 comprises one of three different voltage waveforms. One voltage waveform is generated by a conventional sweep generator 22, another is generated by an acquisition voltage level generator 24, e.g. a constant voltage from a voltage divider network, and the third is generated by a conventional frequency shift keying voltage level generator 26. The outputs from each of these signal generators are fed to converter 14 through a conventional, controllable, single pole, three-throw switch 28. Switch 28 has an output terminal, three signal input terminals A, B, and C, and three control input terminals SG, AQ and FSK. Terminal A is connected to sweep generator 22, terminal B is connected to acquisition voltage level generator 24, and terminal C is connected to frequency shift keying voltage generator 26. A conventional timer 30 having three outputs SG, AQ, FSK, controls switch 28. A periodic, rectangular pulse at the SG output of timer 30, when fed to the SG input of switch 28, causes the output of sweep generator 22 to be fed through switch 28 to converter 14. Similarly, a periodic, rectangular pulse at the AQ output of timer 30, when fed to the AQ input of switch 28, causes the output of acquisition voltage level generator 24 to be fed through switch 28 to converter 14. Also, a periodic, rectangular pulse at the FSK output of timer 30, when fed to the FSK input of switch 28, causes the output of frequency shift keying voltage level generator 26 to be fed through switch 28 to converter 14. The three different pulses from timer 30 occur sequentially, with the pulse at the SG output occurring first, the pulse at the AQ output occurring second, and the pulse at the FSK output occurring last. The duration and the sequence of each of the pulses provided by timer 30 determines the duration and sequence of each of the different types of signals which transmitter 10 generates, the nature of which will be explained hereinafter.

A conventional, digital clock 32 provides periodic, rectangular pulses to timer 30 and to a data generator 34 at their CL terminals. Timer 30 uses the pulses from clock 32 as a time standard by which it measures the duration of each periodic rectangular pulse to determine when to generate the next pulse in the sequence of pulses. Data generator 34, which can be a digital shift register, generates a series of binary ones and zeros having a predetermined pattern and length. Data generator 34 will commence generating the binary series only when a pulse is generated at the FSK output of timer 30 and applied to its T terminal, and a bit will be generated each time clock 32 generates a pulse. The bits from data generator 34 are fed to frequency shift keying voltage level generator 26. Alternatively, data generator 34 may comprise a digital memory which outputs each bit in the predetermined series of bits to frequency shift keying voltage level generator 26 each time it receives a pulse from clock 32, but only during the duration of the FSK output from timer 30.

Sweep generator 22 preferably provides a ramp-shaped waveform having a negative slope and a frequency at a predetermined nominal value between the limits of 2 Hz and 4 Hz. As the ramp sweeps downward, its voltage decreases. For example, at the start of each sweep, the output voltage of sweep generator 22 may be 4 volts, and at the end of each sweep, the output voltage may 2 volts. During the period that timer 30 is providing a signal at its SG output to switch 28, the switch feeds the ramp output of sweep generator 22 to voltage-to-frequency converter 14. During this period, the converter may, for example, generate a nominal 1600 Hz output signal when the voltage level of its input signal is 4 volts, and a nominal 800 Hz output signal when the voltage level of its input signal is 2 volts. This allows the audio output of the converter to remain within the federally assigned limits of 1600 Hz and 300 Hz and to sweep downward over a range of at least 700 Hz. The downward sweeping output of voltage-to-frequency converter 14 is impressed upon the carrier signal by amplitude modulator 16 to produce a modulated radio frequency signal which is broadcast by antenna 18. The broadcast signal may be demodulated by any amplitude modulation communication receiver at a remote location to produce the standard siren-like sound in the speaker of the receiver.

This signal, when fed to voltage-to-frequency converter 14 during the period that timer 30 is producing a signal at its AQ output, causes the converter to generate a single frequency audio tone acquisition signal. The voltage level generated by acquisition voltage level generator 24 will be sufficiently low so that the audio signal produced by voltage-to-frequency converter 14 will be below the audio frequency range of the siren-like signal but high enough so that when the output of the converter is applied to amplitude modulator 16 the resultant modulated radio frequency signal will have sidebands which are sufficiently displaced in frequency from the carrier to be distinguishable from the carrier in an appropriate receiver. A representative audio frequency which serves both of these purposes is 100 Hz. If the foregoing voltage-to-frequency example for sweep generator 22 is linearly extrapolated, then acquisition voltage level generator 24 should generate 0.250 volts to cause the converter to generate 100 Hz.

The frequency shift keying voltage level generator 26 generates two distinct voltage levels in direct response to the voltage level of the binary outputs of data generator 34. The purpose of frequency shift keying voltage level generator 26 is to convert the voltage levels of the output of data generator 34 to appropriate levels before they are fed to voltage-to-frequency converter 14. The two distinct voltage levels, which are fed to voltage-to-frequency converter 14 during the period that timer 30 is producing a signal at its FSK output, cause the converter to generate two audio signals having distinct frequencies. The voltage levels generated by frequency shift keying voltage level generator 26 in response to the output of data generator 34 are such that the audio signals produced by voltage-to-frequency converter 14 are below the range of the siren-like signal and distinct from the signal produced in response to the output of the acquisition voltage level generator. This is done so that the resultant amplitude modulated signal from transmitter 10 will be distinct from, and not interfered by, carrier signals modulated by the siren-like signal or by an acquisition signal. Examples of frequencies which accomplish these purposes are 150 Hz and 250 Hz, which may respectfully represent binary zero and binary one. Following the foregoing examples voltage levels of 0.375 volts and 0.625 volts from frequency shift keying voltage level generator 26 will cause voltage-to-frequency converter 14 to generate 150 Hz and 250 Hz signals.

The pattern of binary zeros and ones generated by data generator 34 is preferably of a length to permit each transmitter user to have its own, unique identification code. By way of example, for a marine vessel, the code may be its maritime identification digits; in turn, for an aircraft, the code may be its identification number. A 30–128 bit field may be used to accomplish this result. One portion of the bit field may represent the identification number of the vessel or aircraft, and the remaining bits in the field may represent items of information, such as an emergency-type code or a geographic location in terms of latitude and longitude. To minimize or eliminate the need for error correcting codes, and to assure that the information generated by data generator 34 is accurately transmitted, the pulse repetition rate of clock 32 is preferably at a low rate, such as 32 pulses per second. To assure even greater accuracy, the information generated by data generator 34 may be in an error correction code format.

The number of bits and data rate in bits per second provided by data generator 34 determine the length of time that timer 30 must generate a pulse at its FSK output. If data generator 34 generates 128 bits, and the data rate is 32 bits per second, then timer 30 should generate a pulse at its FSK output for 4 seconds. The durations of the pulses at the SG and FSK outputs of timer 30 depend on factors which are external to the circuit of transmitter 10, as will be explained hereinafter.

Figure 2A:
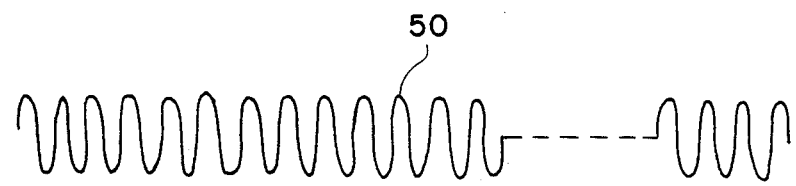
FIGS. 2(a)–2(d) are waveforms illustrating the operation of the ELT or EPIRB of FIG. 1.
Figure 2B:
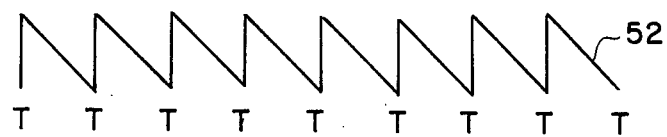
Figure 2C:
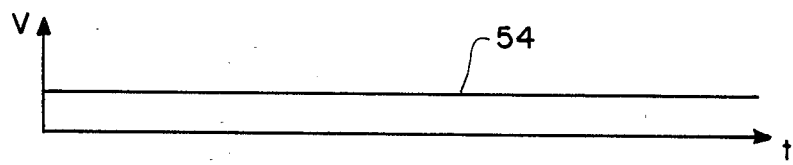
Figure 2D:
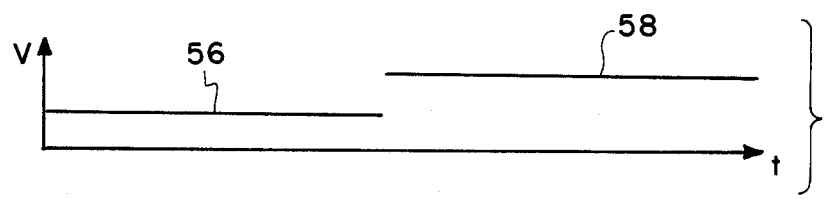

Some typical waveforms occurring in the operation of transmitter 10 are illustrated in FIGS. 2(a) to 2(d). Waveform 50 in FIG. 2(a) represents the constant, high frequency, sinusoidal carrier frequency generated by radio frequency oscillator 12. The frequency of waveform 50 is illustrated as being of a much lower frequency than it is in practice and has a time base different from that in FIGS. 2(b)–2(d). Waveform 52 in FIG. 2(b) represents the ramp-shaped signal generated by sweep generator 22. Although waveform 52 is illustrated as having only a single period T, the period may be fixed at a value between 0.5 seconds, corresponding to a frequency of 2 Hz, and 0.25 seconds, which corresponds to a frequency of 4 Hz. Waveform 54 in FIG. 2(c) represents the continuous, constant magnitude output of acquisition voltage level generator 24, and waveforms 56 and 58 in FIG. 2(d) represent the two distinct voltage level output signals produced by frequency shift keying voltage level operator 26. Waveform 56 may, for example, correspond to binary zero output of data operation 34, while waveform 58 corresponds to binary one.

Figure 3A:
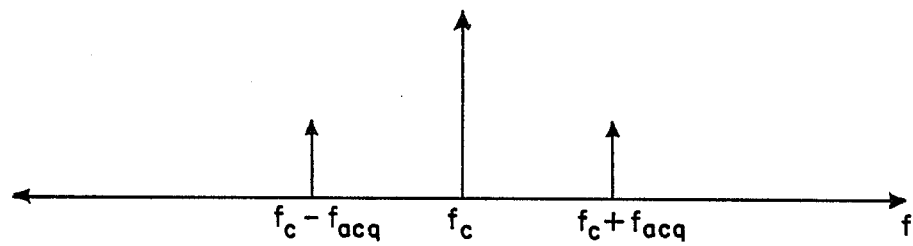
FIGS. 3(a)–3(c) illustrate the energy spectra of the various signals generated by the ELT or EPIRB of FIG. 1.
Figure 3B:
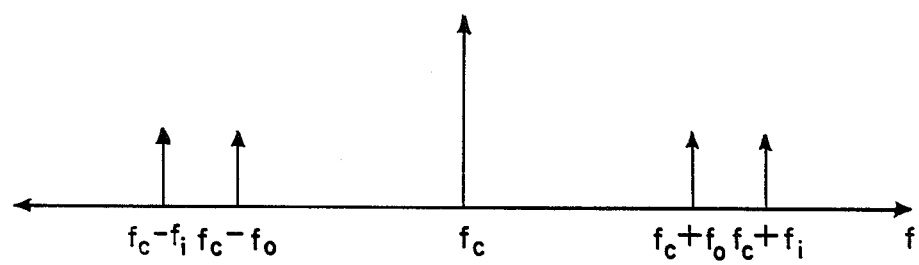
Figure 3C:
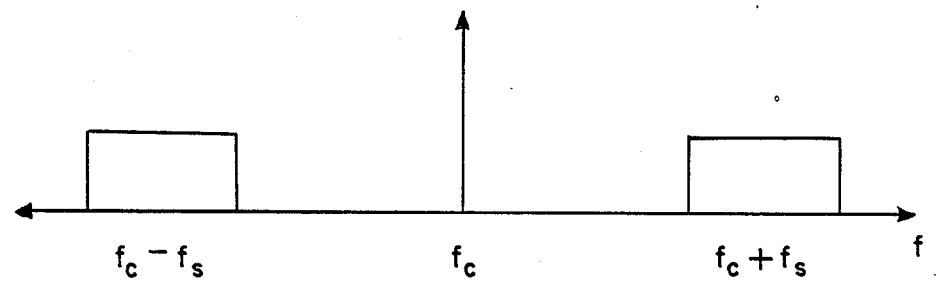

FIGS. 3(a)–3(c) illustrate the energy spectra of the various signals generated by transmitter 10. FIG. 3(a) illustrates the energy spectrum of the acquisition signal, where $f_c$ represents the carrier signal, and $f_c \pm f_{acq}$ represent the sidebands which occur when the carrier signal is amplitude modulated by the acquisition tone. The sidebands produced when the carrier signal is amplitude modulated by the two tones representing the frequency shift keyed information is shown in FIG. 3(b). A binary zero is represented in FIG. 3(b) by $f_c \pm f_o$, where $f_c \pm f_o$ represents the sidebands produced when the carrier signal is amplitude modulated by the tone corresponding to binary zero, and binary one is depicted by the sidebands $f_c \pm f_i$ produced when the carrier signal is amplitude modulated by the tone corresponding to binary one. FIG. 3(c) illustrates the energy spectrum of the carrier signal amplitude modulated by the distress signal, where $f_c \pm f_s$ represent the sidebands produced by the distress signal.

Figure 4A:
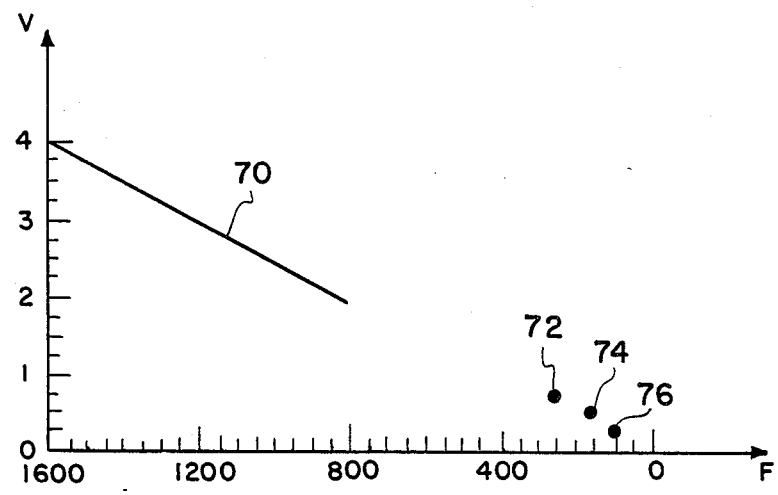
FIGS. 4(a) and 4(b) are graphs which illustrate the frequency response of the voltage-to-frequency converter illustrated in FIG. 1.
Figure 4B:
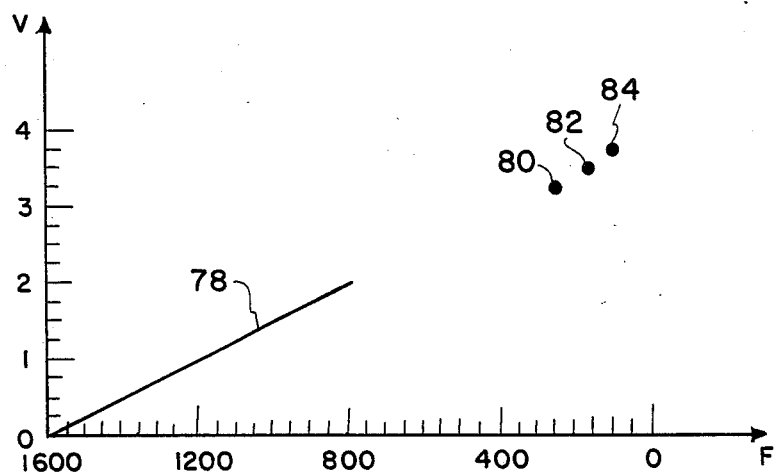

FIG. 4(a) illustrates the frequency response of voltage-to-frequency converter 14 in terms of the examples given hereinbefore. Negative sloping line 70 illustrates the frequency response of the converter to the output of sweep generator 22. Points 72 and 74 illustrate the frequency response to the output of frequency shift keying voltage level generator 26, and point 76 illustrates the frequency response to the output of acquisition voltage level generator 24. While the preferred output of sweep generator 22 is a ramp-shaped waveform having a negative slope, a ramp-shaped waveform having a positive slope may also be used. In this case, voltage-to-frequency converter 14 functions inversely, i.e., as the input voltage level increase, the frequency of the output decreases. FIG. 4(b) illustrates an example. Here, the output of sweep generator 22, illustrated by line 78, sweeps upward from 0 volts to 2 volts, and voltage-to-frequency converter 14 responds by generating frequencies between the range of 1600 Hz to 300 Hz. The frequency response of the converter to the output of the frequency shift keying voltage level generator is illustrated by points 80 and 82. The coordinates of point 80 are 250 Hz and 3.375 volts, and the coordinates of point 82 are 150 Hz and 3.625 volts. Point 84 represents the frequency response of converter 14 to the output of acquisition voltage level generator 24. Its coordinates are 100 Hz and 3.750 volts.

The periodic duration of FSK output of timer 30 depends on the number of bits of data which transmitter 10 must transmit, and the data rate in bits per second. The periodic durations of the SG and AQ outputs of timer 30, however, depend on how the siren-like signal and the acquisition signal are used. The siren-like signal is used to alert individuals monitoring the distress frequencies that an emergency situation exists. As such, it should have a fairly long duration to maximize the probability of its detection. The acquisition signal, on the other hand, may be used by a special receiver in a satellite, as hereinafter discussed, as a preamble to identify transmissions which contain a frequency shift keyed amplitude modulated signal portion so that the information contained in that portion can be extracted and utilized. Accordingly, the duration of the acquisition signal should be only long enough so that a receiver can uniquely identify it in the presence of other signals. An example of signal sequence for timer 30 meeting the above criteria, and utilizing 128 bits of data at a data rate of 32 bits per second, is one in which the duration of the SG output is 52 seconds, the duration of the AQ output is 4 seconds, and the duration of the FSK output is 4 seconds. This yields a signal from transmitter 10 which for 86% of its period demodulates to the siren-like signal, and for 14% of its period demodulates to the acquisition tone and the frequency shift keying tones. Thus, the signal, when demodulated, will, for 86% of the time sound exactly like a standard emergency location transmitter or a standard emergency position indicating radio beacon, and for the remaining 14% of the time it will also have a distinctive sound. Furthermore, the signal broadcast by transmitter 10, regardless of the durations of the pulses from timer 30, will at all times have a distinctive sound when demodulated. Thus, all portions of the signal from transmitter 10 can be used by search and rescue personnel equipped with conventional amplitude modulation receivers for detection and homing.

The signal broadcast by transmitter 10 may also be received by an amplitude modulation receiver which is on board a satellite orbiting the Earth. The satellite receiver, in conjunction with a transmitter also located on board the satellite, may act as a repeater and/or as a signal processor. Satellite reception of distress transmissions is advantageous because the doppler frequency shifts at different points in time of the distress transmission can be precisely measured. This information allows highly accurate calculations of the emergency transmitter location to be made. If the information contained in the frequency shift keyed portion of the distress transmission is extracted, then by using a satellite, search and rescue personnel will known at least the location and the identity of the vessel or aircraft in distress before rescue efforts are initiated.

A satellite receiver may include circuitry which enables it to detect the presence of an acquisition signal. The acquisition signal generated by transmitter 10 has a particular energy spectrum characteristic. This characteristic comprises energy at the frequency of the carrier signal, and energy at predetermined frequency differences from the carrier frequency corresponding to the acquisition signal sidebands. This energy spectrum may be recognized by a receiver using a similar approach to the spectrum analysis techniques described in an article entitled "Nimbus F Random Access Measurement System (RAMS)", by Jim Coates, published in the IEEE Transactions on Geoscience Electronics Group Volume GE-13, Number 1, January, 1975, pages 18–22. A receiver may be able to recognize the energy spectrum characteristic of the acquisition signal even if the signal-to-noise ratio of the received signal is low, the received signal is of low power, and if multiple distress signals are being broadcast simultaneously. This occurs because the sidebands due to the acquisition signal are preferably located in portions of the distress signal bandwidth which are not normally utilized for either distress transmissions or for normal audio voice transmissions. As such, they should not be subject to interference by other signals. Even if other signals are present, the spectrum associated with the acquisition signal provides a long duration, uniquely recognizable, characteristic which can be detected even when other signals are sweeping through its spectral region. This is also true for the frequency shift keyed signal generated by transmitter 10. Examples of signals which might normally sweep through the spectral regions of the acquisition signal or the frequency shift keyed signal are the radio frequency carrier modulated with the siren-like audio distress signal and the radio frequency carrier modulated with audio voice communications. Additionally, transmitters at different geographical positions may generate signals, which because of doppler shifts, have energy in the spectral region of the acquisition signal or the frequency shift keyed signal. However, these two signals, because of their unique recognizable characteristics, will still be uniquely recognizable in the presence of doppler shifted signals, unless two or more identical signals are received simultaneously.

Simultaneous detection and processing of multiple distress signals, where each signal contains an acquisition signal portion and a frequency shifted keyed portion, is also possible with a satellite receiver as long as each signal is displaced in doppler frequency and/or time from the other signals. To accomplish this, the receiver is equipped with a plurality of signal detection and processing circuits. Once any particular signal is received, analyzed, and recognized as an acquisition signal, circuitry in the receiver is initiated to store the frequency shift keyed data, along with data pertaining to the doppler frequencies and time of reception information, for data retransmission to a satellite ground station.

Only a relatively small number of bits of data is required to positively identify a particular transmitter and, therefore, it is possible to store on board a satellite the identification data of a large number of emergency transmitters with a fairly small amount of memory capacity. Additionally, because two distinct frequencies are used to represent a binary zero and a binary one, the determination between them is unambiguous, and the probability of correctly identifying a particular transmitter is correspondingly very high.

A receiver which is not on-board a satellite may also receive the acquisition tone and the frequency shift keyed data to identify a transmitter. But because there is minimal doppler shift information, only directional information, in addition to the identity of the transmitter, can normally be obtained.

Obviously, numerous modifications and variations of the present invention are possible in light of this disclosure. It is therefore to be understood that within the scope of the appended claims the invention may be practiced other than as specifically described herein.

I claim:

1. A transmitter including:
   means for generating a radio frequency carrier;
   means for generating an encoded information bearing signal, said means including the amplitude modulation of said carrier;
   means for generating an acquisition signal, said means including the amplitude modulation of said carrier by a constant frequency waveform, said acquisition signal providing enhanced signal acquisition and interference rejection capability favoring said information bearing signal in an environment where there may be multiple signals in the same frequency band as said information bearing signal and having substantially all of its transmitted spectral power, in terms of frequency, very close to, but displaced from, the transmitted spectral power of said radio frequency carrier; and
   means to sequentially transmit both said acquisition signal and said information bearing signal.

2. The transmitter of claim 1 wherein said constant frequency waveform is a single frequency.

3. The transmitter of claim 1 wherein said acquisition signal has substantially all of its transmitted spectral power, in terms of frequency, very close to, but displaced from, the transmitted spectral power of said information bearing signal.

4. The transmitter of claim 3 wherein said acquisition signal transmitted spectral power, in terms of frequency, is between the carrier frequency and the lowest sideband of said information bearing signal.

5. The transmitter of claim 1 wherein said acquisition signal's transmitted spectral power, in terms of frequency, is closer, in frequency, to the spectral power, in terms of frequency, of said radio frequency carrier than is the spectral power, in terms of frequency, of said information bearing signal.

6. A vehicle borne distress transmitter including:
   means for generating a radio frequency carrier;
   means for generating a distress signal, said means including the amplitude modulation of said carrier;
   means for generating an information bearing signal, said means including the amplitude modulation of said carrier;

means for generating an acquisition signal, said means including the amplitude modulation of said carrier and said modulation being provided by a constant frequency waveform, said acquisition signal providing enhanced signal acquisition and interference rejection favoring said information bearing signal in an environment where there are multiple signals in the same frequency band as the information bearing signal; and means to sequentially transmit said distress signal, said information bearing signal and said acquisition signal, said acquisition signal immediately preceding, in terms of the time or order of transmission, said information bearing signal.

7. The distress transmitter of claim 6 wherein said constant frequency waveform is a single frequency.

8. The distress transmitter of claim 6 wherein said acquisition signal has substantially all of its transmitted spectral power, in terms of frequency, very close to, but displaced from, the transmitted spectral power of both said distress signal and said information bearing signal.

9. The distress transmitter of claim 6 wherein said distress signal amplitude modulation is provided by a swept, audio frequency waveform.

10. The transmitter of claim 6 wherein said information bearing signal includes information relating to the identification of said vehicle.

11. The transmitter of claim 8 wherein said acquisition signal transmitted spectral power, in terms of frequency, is between the carrier frequency and the lowest sideband of said information bearing signal and said distress signal transmitted power, in terms of frequency, is above the highest sideband of said information bearing signal.

12. The distress transmitter of claim 6 wherein said acquisition signal's transmitted spectral power, in terms of frequency, is essentially within 400 Hz of either side of said radio frequency carrier.

13. The distress transmitter of claim 6 wherein said acquisition signal's transmitted spectral power, interms of frequency, is very close to, but displaced from, the transmitted spectral power of said radio frequency carrier.

14. The distress transmitter of claim 6 wherein said acquisition signal's transmitted spectral power, in terms of frequency, is closer, in frequency, to the spectral power, in terms of frequency, of said radio frequency carrier than is spectral power, in terms of frequency, of said information bearing signal.

* * * * *